United States Patent
Wong et al.

(10) Patent No.: US 7,317,183 B2
(45) Date of Patent: Jan. 8, 2008

(54) HIGH PERFORMANCE REFLECTIVITY OPTICAL ENCODER WITH A PROTRUSION BETWEEN LENSES

(75) Inventors: Weng Fei Wong, Penang (MY); Yee Loong Chin, Perak (MY); Siang Leong Foo, Penang (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 125 days.

(21) Appl. No.: 11/408,902

(22) Filed: Apr. 21, 2006

(65) Prior Publication Data

US 2007/0246645 A1 Oct. 25, 2007

(51) Int. Cl.
*G01D 5/34* (2006.01)
(52) U.S. Cl. .................. 250/231.13; 250/239

(58) Field of Classification Search ........... 250/231.13, 250/231.16, 231.18, 237 R, 551, 216; 341/11, 341/13
See application file for complete search history.

(56) References Cited

U.S. PATENT DOCUMENTS 4,447,143 A * 5/1984 Heitmann et al. .......... 396/111

* cited by examiner

*Primary Examiner*—Que T Le

(57) ABSTRACT

An optical encoder includes an emitter, a first lens, a detector, a second lens, and a protrusion. The emitter emits light which is directed by the first lens to a code scale for reflection. The reflected light is directed by the second lens to the detector. The detector detects the reflected light from the code scale. The protrusion is between the first lens and the second lens. The protrusion defines at least one surface that refracts stray light from the emitter away from the detector. Accordingly, the stray light does not reach the detector; thus the detector can operate more effectively.

10 Claims, 3 Drawing Sheets

HIGH PERFORMANCE REFLECTIVITY OPTICAL ENCODER WITH A PROTRUSION BETWEEN LENSES

BACKGROUND

The present invention relates generally to optical encoders. More particularly, the present invention relates to improved optical encoders having higher contrast than prior art encoders.

Optical encoders detect motion and typically provide closed-loop feedback to a motor control system. When operated in conjunction with a code scale, an optical encoder detects motion (linear or rotary motion of the code scale), converting the detected motion into digital signal that encode the movement, position, or velocity of the code scale. Here, the phrase "code scale" includes code wheels and code strips.

Usually, motion of the code scale is detected optically by means of an optical emitter and an optical detector. The optical emitter emits light impinging on and reflecting from the code scale. A typical code scale includes a regular pattern of slots and bars that reflect light in a known pattern. Light is either reflected or not reflected from the code scale. The reflected light is detected by the optical detector. As the code scale moves, an alternating pattern of light and dark corresponding to the pattern of the bars and spaces reaches the optical detector. The optical detector detects these patterns and produces electrical signals corresponding to the detected light, the electrical signals having corresponding patterns. The electrical signal, including the patterns, can be used to provide information about position, velocity and acceleration of the code scale.

FIG. 1A illustrates a cross sectional side view schematic of a known optical encoder 100 and a code scale 120. FIG. 1B is the code scale 120 as viewed from the optical encoder 100. FIGS. 1A and 1B include orientation axes legend for even more clarity.

Referring to FIGS. 1A and 1B, the encoder 100 includes an optical emitter 102 and an optical detector 104 mounted on a substrate 106 such as a lead frame 106. The optical emitter 102 and the optical detector 104 as well portions of the lead frame 106 are encapsulated in an encapsulant 108 including, for example, clear epoxy. The encapsulant 108 defines a first dome-shaped surface 110 (first lens 110) over the optical emitter 102 and a second dome-shaped surface 112 (second lens 112) over the optical detector 104.

The optical emitter 102 emits light 114 that leaves the encapsulant 108 via the first lens 110. The first lens 110 concentrates or directs the emitted light 114 toward the code scale 120, the light reflecting off of the code scale 120. The reflected light 116 reaches the optical detector 104 via the second lens 112. The second lens 112 concentrates or directs the reflected light toward the optical detector 104. The optical detector 104 can be, for example only, photo detector that converts light into electrical signals.

The shape and the size of the first lens 110 and the second lens 112 are dictated by various factors such as, for example only: the distance of the code scale 102 from the lenses 110 and 112 and the characteristics of the emitter 102 and the detector 104.

Often, space 118 between the lenses 110 and 112 is filled with the same encapsulant 108 material and has a flat surface 117. The flat surface 117 presents a surface from which stray light such as stray light 119 from the emitter 102 reflects to impinge on the detector 102 as reflected stray light 121. Such stray light 119 is not desired because stray light that reach the detector 102 introduces false signals, lowers resolutions at which the desired signals can be analyzed.

Accordingly, there remains a need for improved optical encoder that alleviates or overcomes these shortcomings.

SUMMARY

The need is met by the present invention. In a sample embodiment of the present invention, an optical encoder includes an emitter, a first lens, a detector, a second lens, and a protrusion. The emitter emits light which is directed by the first lens to a code scale for reflection. The reflected light is directed by the second lens to the detector. The detector detects the reflected light from the code scale. The protrusion is between the first lens and the second lens. The protrusion defines at least one surface that refracts stray light from the emitter away from the detector. Accordingly, the stray light does not reach the detector; thus the detector can operate more effectively.

The protrusion can be formed in many different shapes. For example, the protrusion can have frustum shape including, but not limited to, a frustum of a circular cone. Alternatively, the protrusion can have, as additional examples only, pyramid shape or a generally hemispherical shape. The protrusion connects the first lens and the second lens. In fact, the protrusion and the two lenses can be made from the same encapsulant material. The encapsulant material is formed to include surfaces that define the first lens, the second lens, the protrusion, or any combination of these. Further, the encapsulant material encapsulates the emitter, the detector, or both, with the first lens being proximal to the emitter and the second lens being proximal to the detector.

Other aspects and advantages of the present invention will become apparent from the following detailed description, taken in conjunction with the accompanying drawings, illustrating by way of example the principles of the invention.

DETAILED DESCRIPTION

The present invention will now be described with reference to the Figures which illustrate various embodiments of the present invention. In the Figures, some sizes of structures or portions may be exaggerated and not to scale relative to sizes of other structures or portions for illustrative purposes and, thus, are provided to illustrate the general structures of the present invention. Furthermore, various aspects of the present invention are described with reference to a structure or a portion positioned "on" or "above" relative to other structures, portions, or both. Relative terms and phrases such as, for example, "on" or "above" are used herein to describe one structure's or portion's relationship to another structure or portion as illustrated in the Figures. It will be understood that such relative terms are intended to encompass different orientations of the device in addition to the orientation depicted in the Figures.

For example, if the device in the Figures is turned over, rotated, or both, the structure or the portion described as "on" or "above" other structures or portions would now be oriented "below," "under," "left of" "right of" "in front of," or "behind" the other structures or portions. References to a structure or a portion being formed "on" or "above" another structure or portion contemplate that additional structures or portions may intervene. References to a structure or a portion being formed on or above another structure or portion without an intervening structure or portion are described herein as being formed "directly on" or "directly above" the other structure or the other portion. Same reference number refers to the same elements throughout this document.

Figure 2:
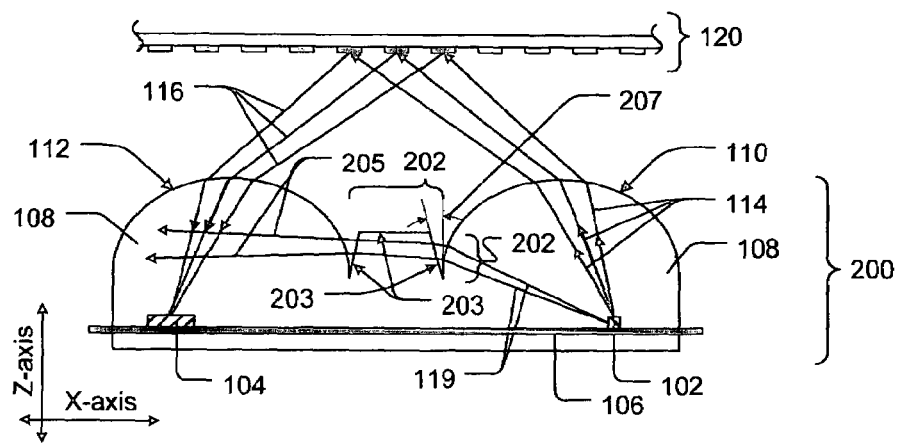
FIG. 2 illustrates an optical encoder according to one embodiment of the present invention.

Referring to FIG. 2, a cross sectional side view schematic of an optical encoder 200 in accordance with one embodiment of the present invention is illustrated. The optical encoder 200 includes an emitter 102 operable to emit light. The emitted light is directed by a first lens 110 toward a code scale 120 for reflection. The reflected light is directed by a second lens 112 toward a detector 104. The detector 104 is adapted to detect the reflected light directed by the second lens 112. The emitter 102 and the detector 104 may be mounted on a substrate 106 such as a lead frame 106.

The optical emitter 102 is encapsulated in an encapsulant material 108 including, for example, clear epoxy. The encapsulant 108 includes a dome-shaped surface 110 that defines the first lens 110. The first lens 110 is proximal to the emitter. The same encapsulant material 108 is used, in the illustrated sample embodiment, to encapsulate the detector 104 and form a dome-shaped surface 112 that defines the second lens 112. The second lens 112 is proximal to the detector.

The same encapsulant material 108 is used, in the illustrated sample embodiment, to form a protrusion 202. The protrusion 202 is between the first lens 110 and the second lens 112. In fact, the protrusion 202 connects the first lens 110 and the second lens 112. The protrusion 202 defines protrusion surfaces 203 that refract the stray light 119 such that the refracted stray light 205 does not reach the detector 104. Thus, the stray light 119 is prevented from reaching the detector 104.

Again, FIG. 2 illustrated the optical encoder 200 in a cross sectional side view. In three dimensions, the protrusion 202 is, as illustrated in FIG. 2, a frustum shape—frustum of a pyramid or frustum of a circular cone.

Figure 3:
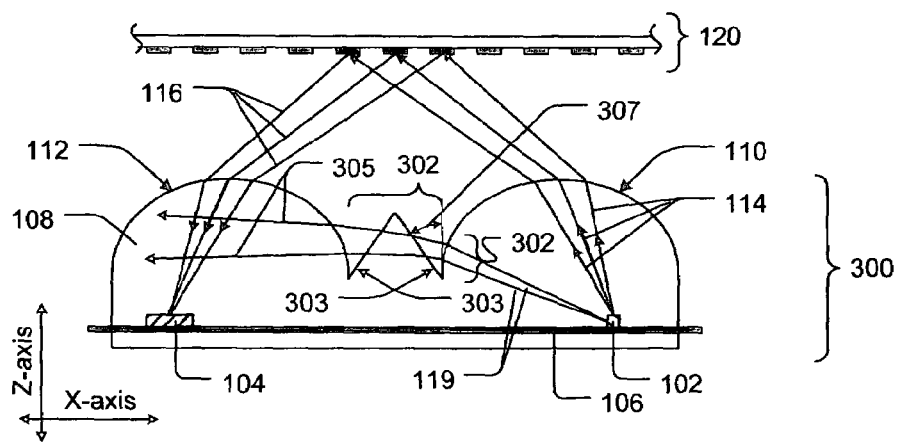
FIG. 3 illustrates an optical encoder according to another embodiment of the present invention.

FIG. 3 illustrates cross sectional side view of another embodiment of the optical encoder of the present invention as an optical encoder 300. Referring to FIG. 3, portions of the optical encoder 300 are similar to corresponding portions of the optical encoder 200 of FIG. 2. The optical encoder 300 includes a protrusion 302 that has pyramid shape that present surfaces 303 at an angle 307 different than the angle 207 of the surfaces 203 of the protrusion 202 of the optical encoder 200 of FIG. 2. With the optical encoder 300, similar desired result in achieved. That is, the protrusion 302 and its surfaces 303 refract the stray light 119 such that the refracted stray light 305 does not reach the detector 104. Thus, the stray light 119 is prevented from reaching the detector 104.

Figure 4:
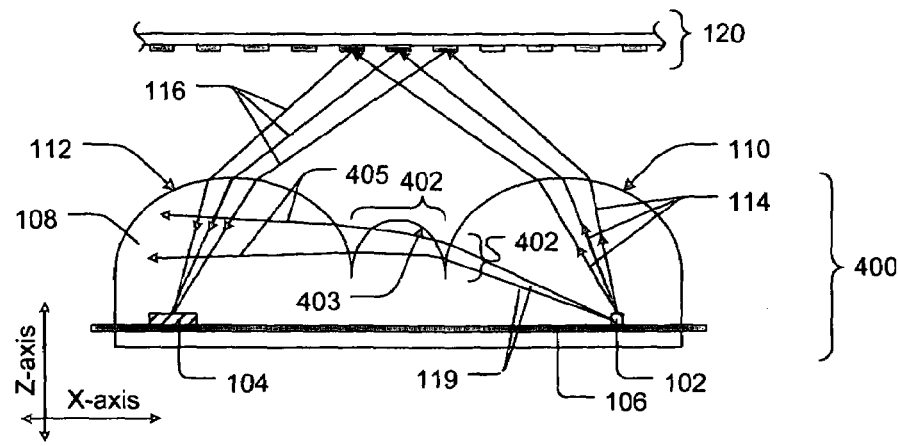
FIG. 4 illustrates an optical encoder according to yet another embodiment of the present invention.

FIG. 4 illustrates cross sectional side view of yet another embodiment of the optical encoder of the present invention as an optical encoder 400. Referring to FIG. 4, portions of the optical encoder 400 are similar to corresponding portions of the optical encoder 200 of FIG. 2. The optical encoder 400 includes a protrusion 402 that generally has hemispherical shape that present a curved surface 403. With the optical encoder 400, similar desired result in achieved. That is, the protrusion 402 and its surface 403 refracts the stray light 119 such that the refracted stray light 405 does not reach the detector 104. Thus, the stray light 119 is prevented from reaching the detector 104.

Referring to FIGS. 2, 3, and 4. The each of the protrusions 202, 302, and 402 connect the first lens 110 and the second lens 112. In fact, the protrusions 202, 302, and 402 are made with the same encapsulant material 108 as the first lens 110 and the second lens 112.

Figure 1A:
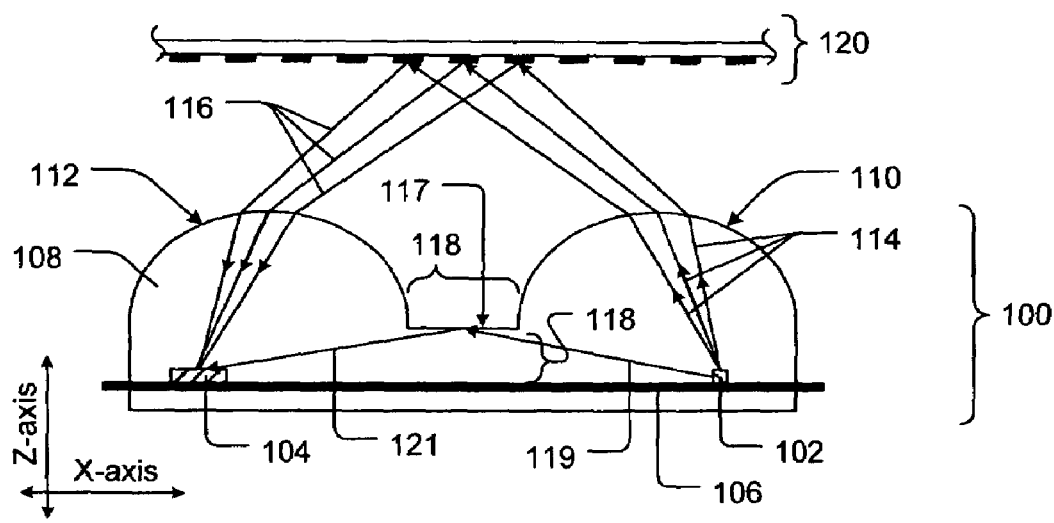
FIG. 1A illustrates a cross sectional side view schematic of a known optical encoder and a code scale.
Figure 1B:
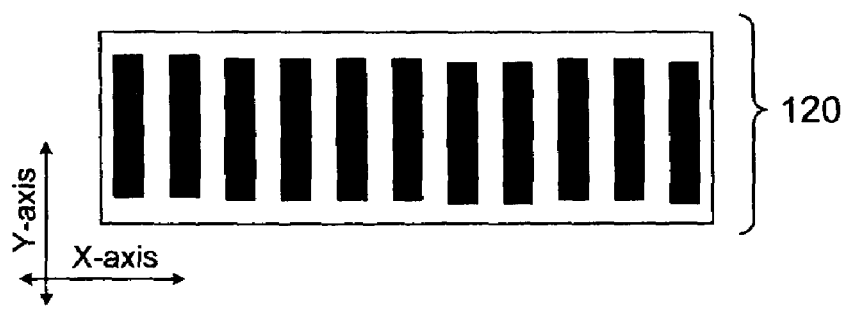
FIG. 1B is the code scale of FIG. 1A as viewed from the optical encoder of FIG. 1A.
Figure 5:
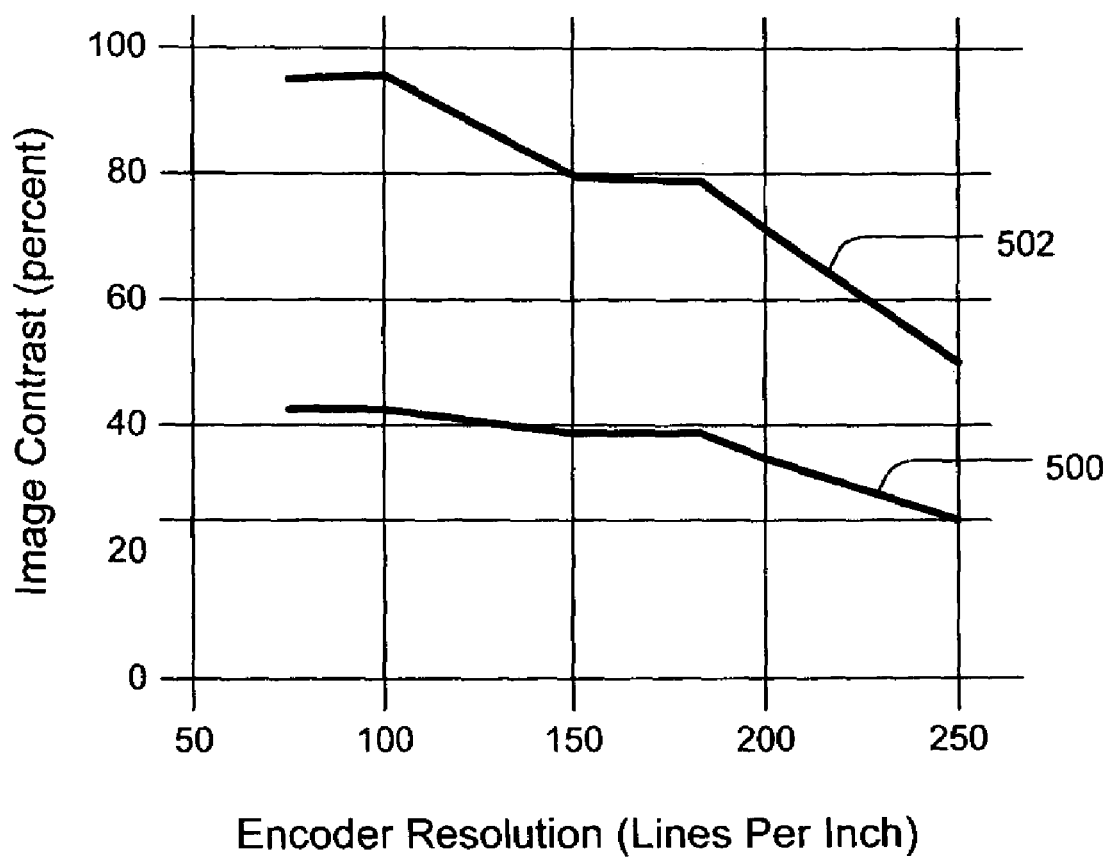
FIG. 5 includes a graph including curves useful for illustrating operating characteristics of an optical encoder of the present invention as compared with those of a prior art optical encoder.

FIG. 5 illustrates two curves 500 and 502. The first curve 500 demonstrates measured image contrast at various resolutions measured using the prior art optical encoder 100 of FIG. 1. The measured image contrast is in percentages; the resolutions are measured as lines per inch. As shown by the first curve 500, the measured contrast is at slightly over 40 percent at 100 lines per inch, and decreases at higher resolutions. At the resolution of 250 lines per inch, the measured contrast is only at approximately 20 percent.

The second curve 502 demonstrates measured image contrast at various resolutions measured using the optical encoder 200 of FIG. 2. As shown by the second curve 502, the measured contrast is easily over 90 percent at 100 lines per inch. Even at higher resolutions, the measured contrast for the optical encoder 200 is much higher than the measured contrast of the optical encoder 100 of FIG. 1. At the resolution of 250 lines per inch, the measured contrast is near 50 percent for the optical encoder 200. Such improvement in contrast results from the fact that stray light is prevented from reaching the detector 104.

From the foregoing, it will be apparent that the present invention is novel and offers advantages over the current art. Although specific embodiments of the invention are described and illustrated above, the invention is not to be limited to the specific forms or arrangements of parts so described and illustrated. For example, differing configurations, sizes, or materials may be used but still fall within the scope of the present invention. The invention is limited by the claims that follow.

What is claimed is:

1. An optical encoder comprising:
an emitter operable to emit light;
a first lens proximal to said emitter, said first lens adapted to direct the emitted light to a code scale for reflection;
a detector adapted to detect light reflected from the code scale;
a second lens proximal to said detector, said second lens adapted to direct the reflected light to the detector; and
a protrusion between said first lens and said second lens, said protrusion defining at least one surface, the surface adapted to refract stray light from said emitter away from said detector.

2. The optical encoder recited in claim 1 wherein said protrusion has frustum shape.

3. The optical encoder recited in claim 2 wherein said protrusion has shape of frustum of a circular cone.

4. The optical encoder recited in claim 1 wherein said protrusion has pyramid shape.

5. The optical encoder recited in claim 1 wherein said protrusion has hemispherical shape.

6. The optical encoder recited in claim 1 wherein said first lens and said second lens are connected by said protrusion.

7. The optical encoder recited in claim 1 wherein said first lens, said second lens, and said protrusion comprises same encapsulant material.

8. The optical encoder recited in claim 1 wherein encapsulant material encapsulates said emitter and includes a surface that defines the first lens.

9. The optical encoder recited in claim 8 wherein the same encapsulant material is used to encapsulate said detector, the encapsulant material encapsulating said detector including a surface that defines the second lens.

10. The optical encoder recited in claim 8 wherein the same encapsulant material is used to form said protrusion.

* * * * *